Figure 12:
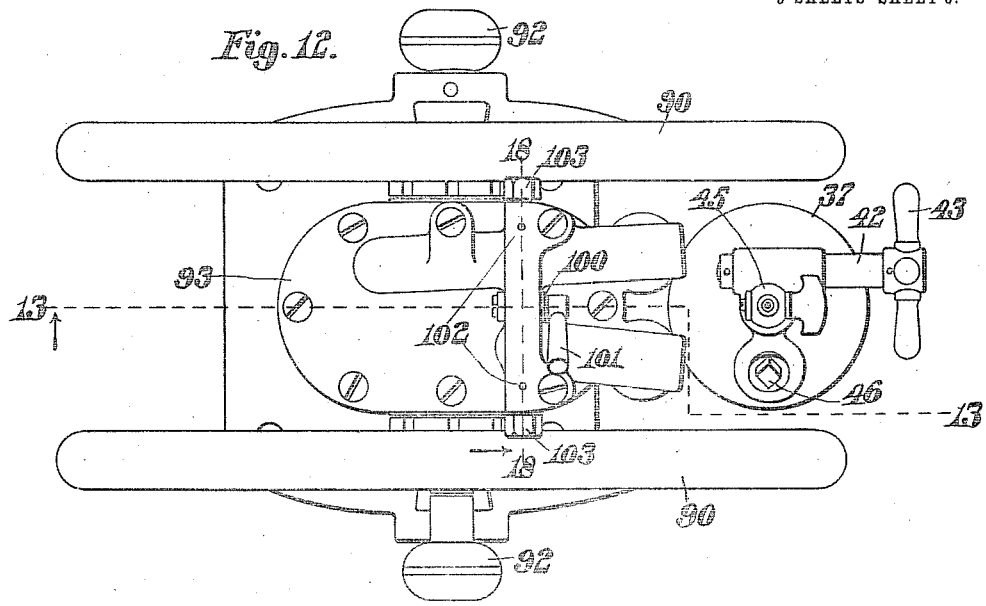

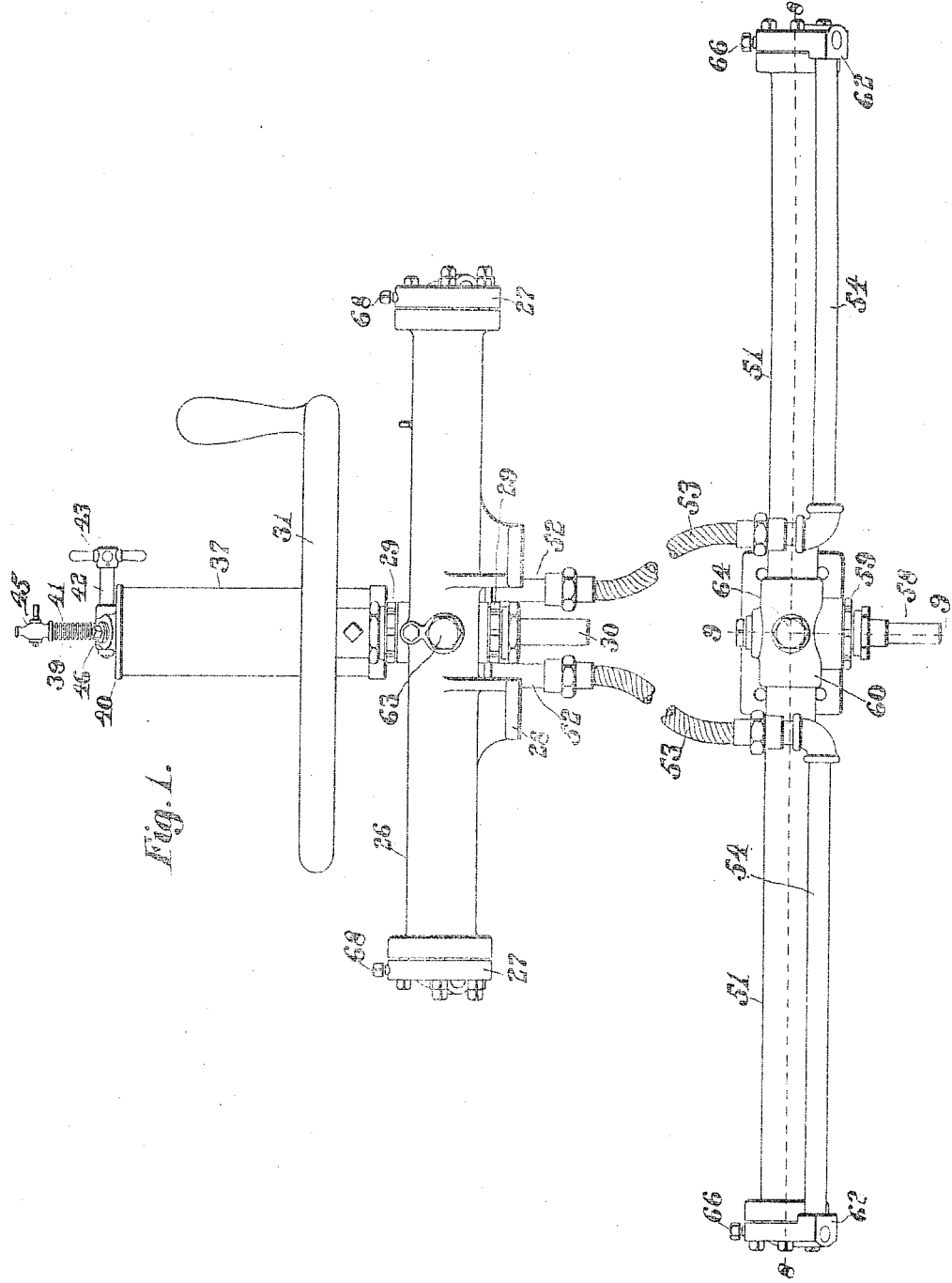

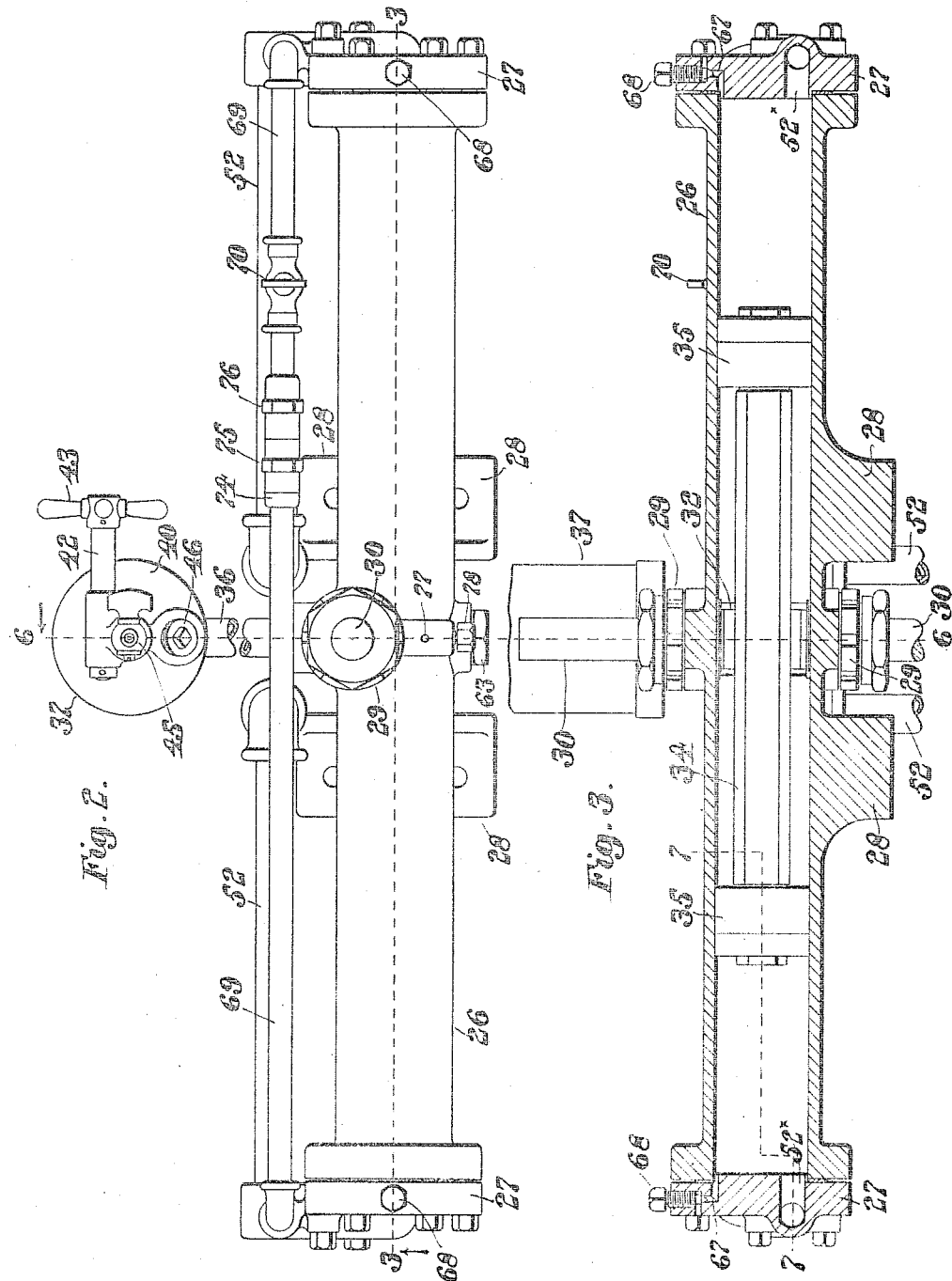

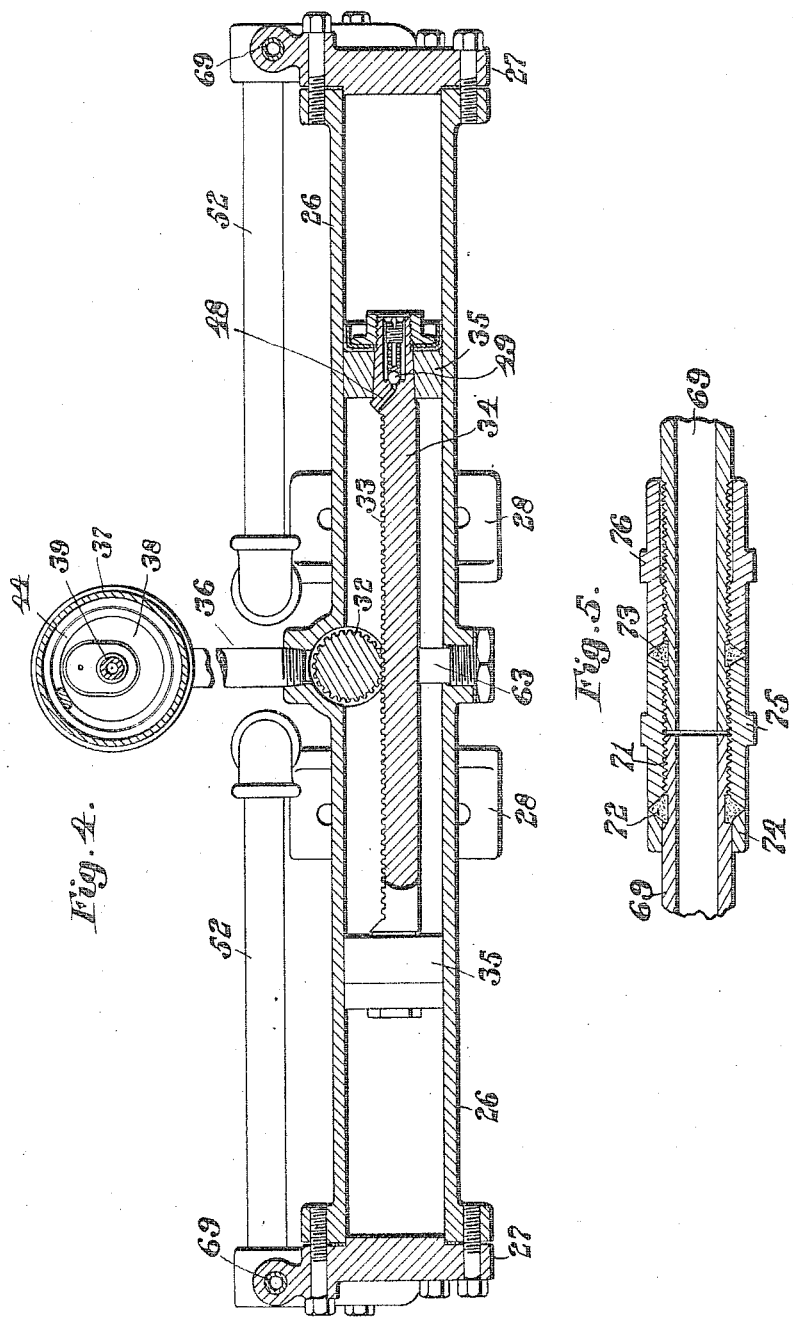

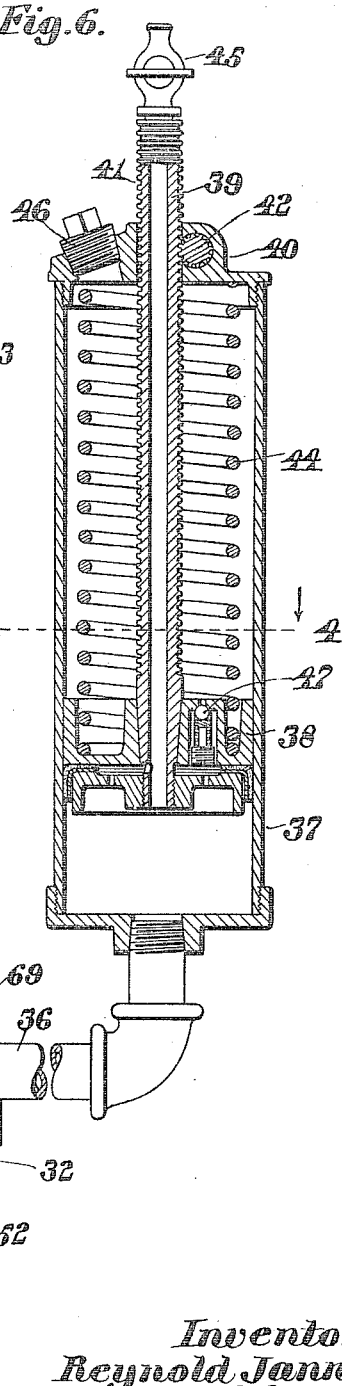
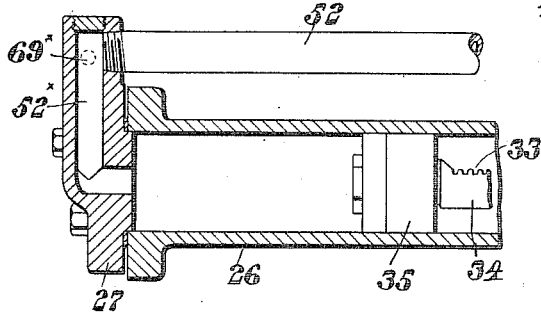
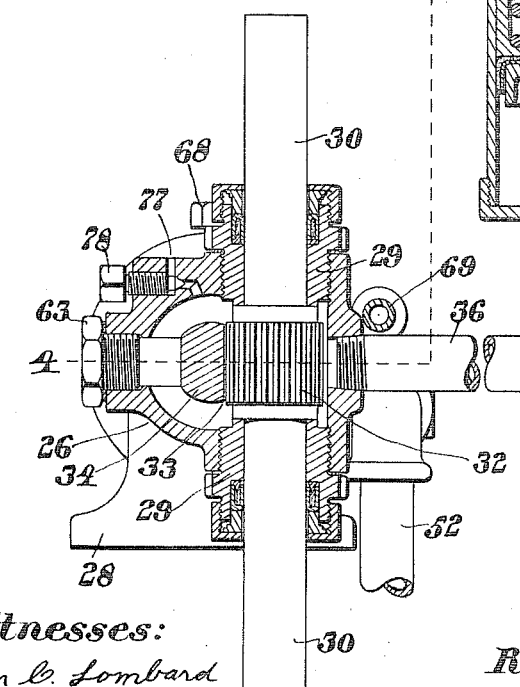

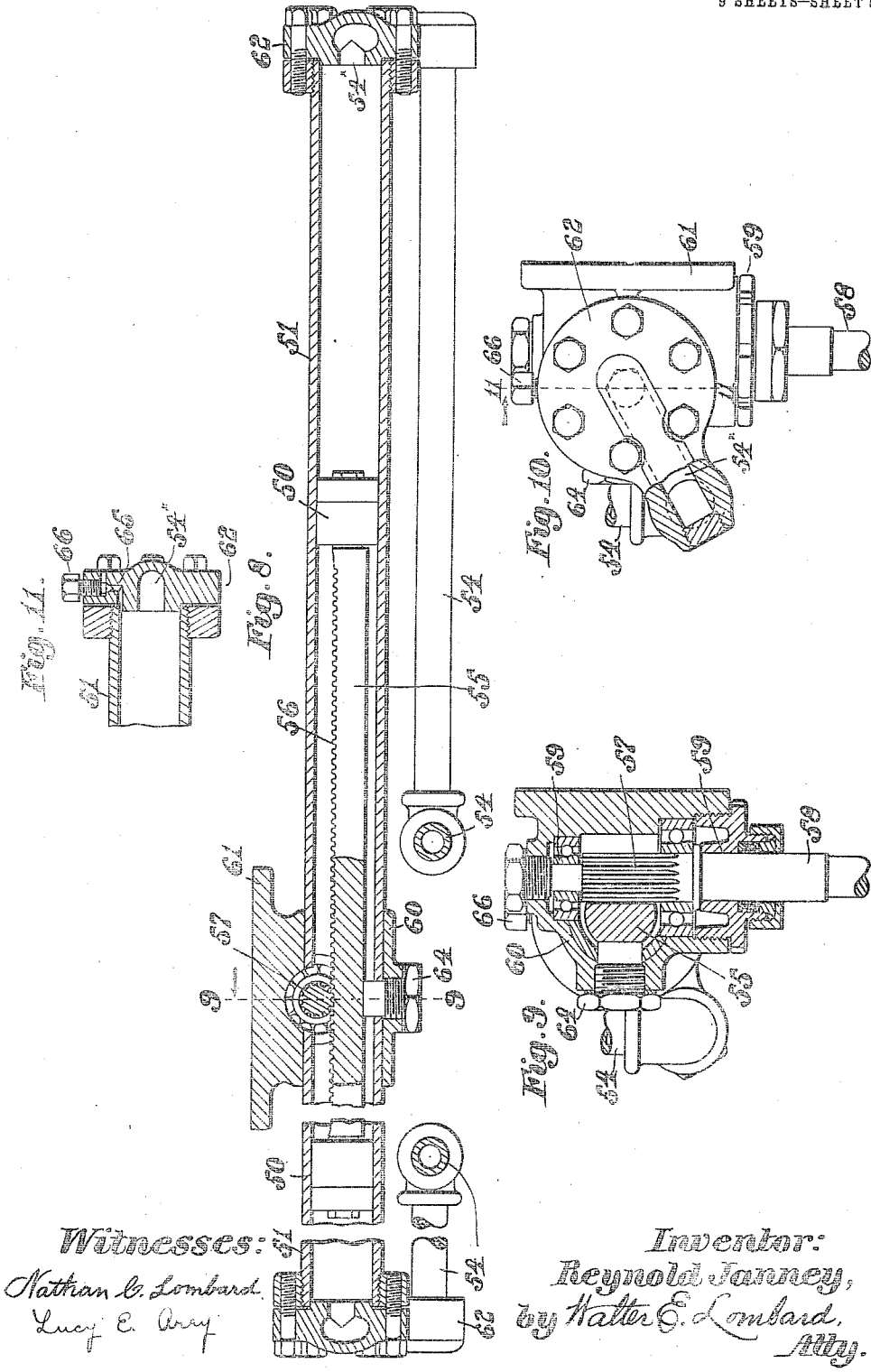

R. JANNEY.
TELEMOTOR.
APPLICATION FILED JAN. 14, 1910.

985,899.

Patented Mar. 7, 1911.

9 SHEETS—SHEET 6.

Witnesses:
Nathan C. Lombard
Lucy E. Ary

Inventor:
Reynold Janney,
by Walter E. Lombard,
Atty.

R. JANNEY.
TELEMOTOR.
APPLICATION FILED JAN. 14, 1910.

985,899.

Patented Mar. 7, 1911.
9 SHEETS—SHEET 7.

Witnesses:
Nathan L. Lombard
Lucy E. Avery

Inventor:
Reynold Janney,
by Walter E. Lombard,
Atty.

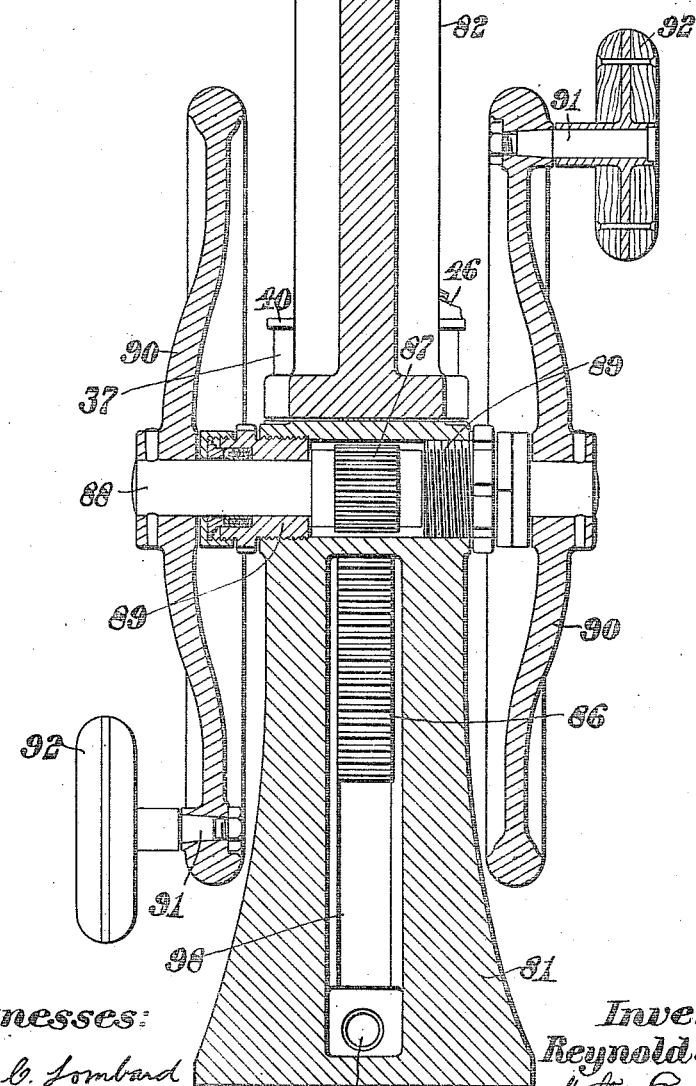

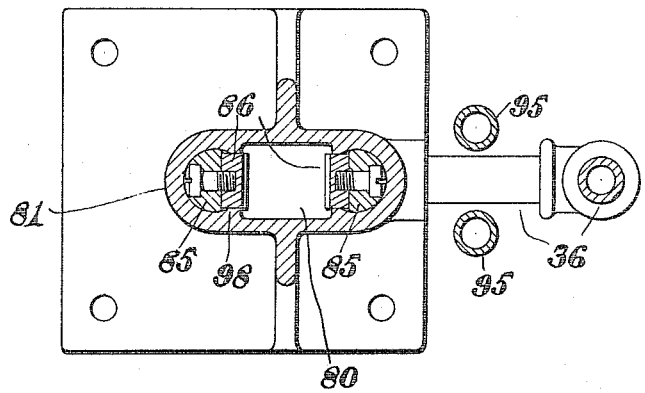
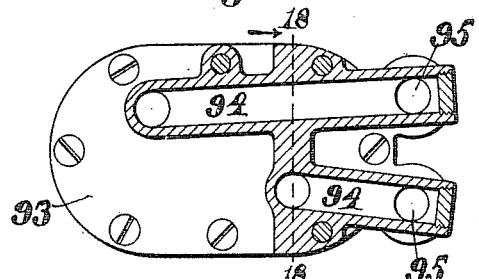
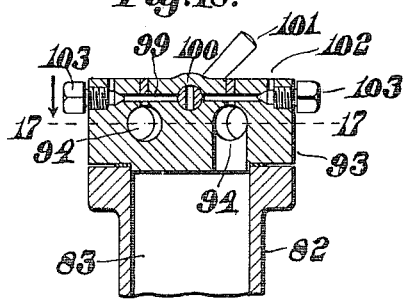

UNITED STATES PATENT OFFICE.

REYNOLD JANNEY, OF NEW YORK, N. Y.

TELEMOTOR.

985,899. Specification of Letters Patent. Patented Mar. 7, 1911.

Application filed January 14, 1910. Serial No. 538,547.

*To all whom it may concern:*

Be it known that I, REYNOLD JANNEY, a citizen of the United States of America, and a resident of New York, in the county of New York and State of New York, have invented certain new and useful Improvements in Telemotors, of which the following is a specification.

This invention relates to telemotors and particularly to that type of telemotor in which hydraulic pressure is utilized to control the operation of an actuating device by a manually operated controlling device located remotely from said actuating device.

Heretofore hydraulic telemotors have been used in which rotary motion could be transmitted indefinitely in one direction or the other by a pump which was adapted to keep up a circulation of fluid through a suitable hydraulic engine or other actuating device. In all such telemotors either a fixed inclosed quantity of fluid is caused to circulate throughout the system and is used over and over, or the fluid used therein may be drawn from an indefinite or inexhaustible source of supply and exhausted, from the engine or actuating device, as used. In the present invention, a fixed and unchanging quantity of fluid is used, one half of which is confined to each half of the telemotor system and is subjected alternately to pressure and suction as the direction of motion is reversed.

In the operation of a device embodying the features of the present invention, one of the greatest difficulties to be contended with is the leakage from the system, this leakage tending to make the apparatus unbalanced and imperfect in its operation.

One of the principal objects of the present invention is to overcome this objection and provide a system in which the movable member or members in the actuating device will operate synchronously and positively with any movement of the movable member or members forming a part of the controller. This positive action and simultaneous operation of the two ends of the system is effected by providing a fluid supply reservoir in which fluid is confined under pressure and is permitted to flow into the system to replenish any deficiency therein due to leakage of the fluid therefrom.

The invention consists in certain novel features of construction and arrangement of parts which will be readily understood by reference to the description of the drawings and to the claims hereinafter given.

Figure 14:
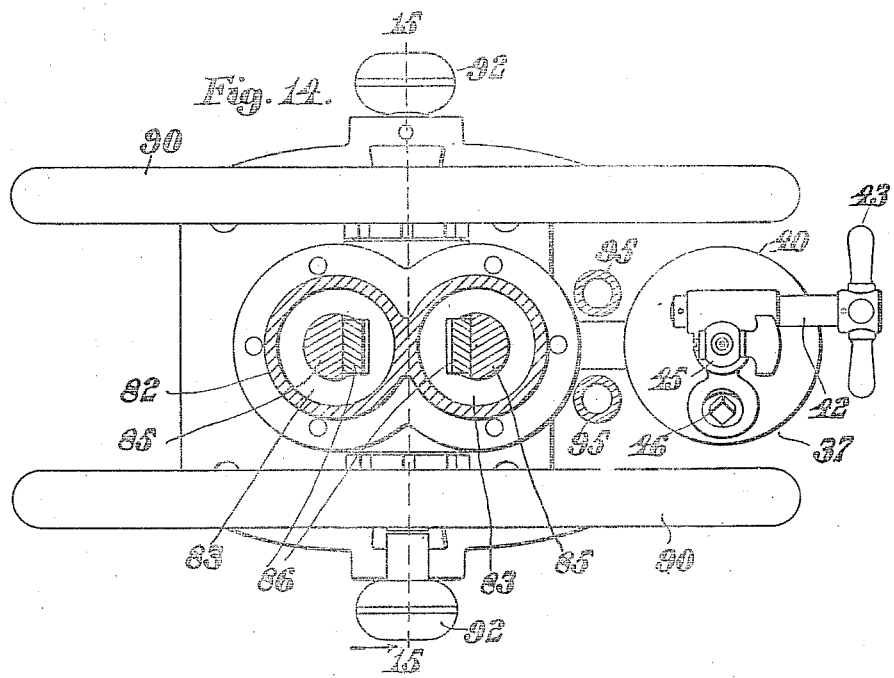
Figure 13:
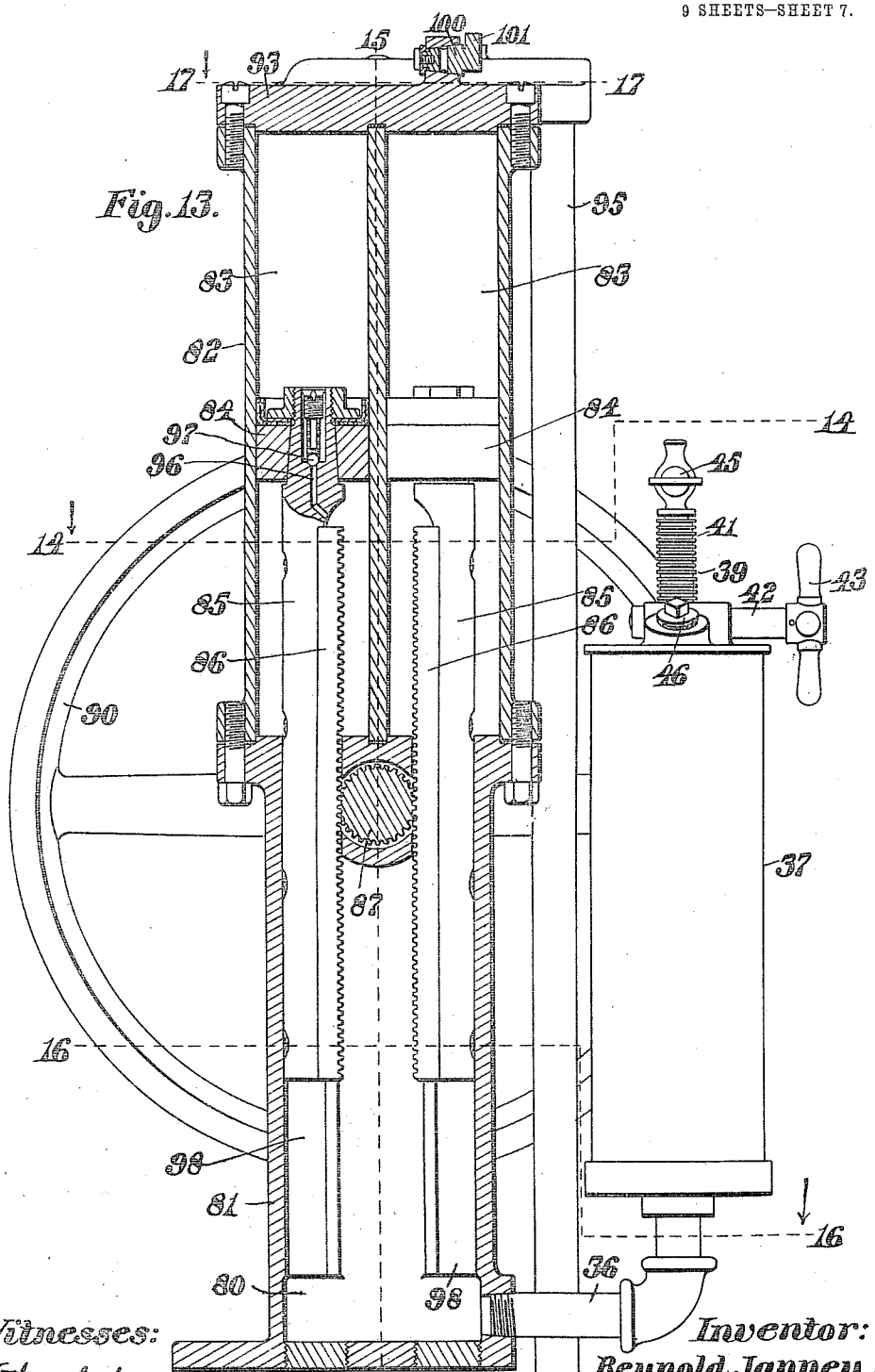

Of the drawings, Figure 1 represents an elevation of an apparatus embodying the features of the present invention. Fig. 2 represents a plan view of the controlling device forming a part of said apparatus. Fig. 3 represents a longitudinal section of the same, the cutting plane being on line 3—3 on Fig. 2, looking in the direction of the arrow. Fig. 4 represents a horizontal section of the same, the cutting plane being on line 4—4 on Fig. 6. Fig. 5 represents a sectional detail of a portion of the by-pass pipe, and the coupling members therefor. Fig. 6 represents a vertical section of the controlling device and the fluid supply reservoir, the cutting plane being on line 6—6 on Figs. 2 and 3, looking in the direction of the arrow. Fig. 7 represents a sectional detail of one end of the cylinder of the controlling device, the cutting plane being on line 7—7 on Fig. 3. Fig. 8 represents a horizontal section of the actuating device or hydraulic engine, the cutting plane being on line 8—8 on Fig. 1. Fig. 9 represents a transverse section of the same, the cutting plane being on line 9—9 on Fig. 8 looking in the direction of the arrow. Fig. 10 represents an end elevation of the same, a portion of the same being broken in section. Fig. 11 represents a section of one end of the actuating device cylinder and the closure therefor, the cutting plane being on line 11—11 on Fig. 10 looking in the direction of the arrow. Figs. 5, 9, and 10 are drawn to an enlarged scale. Fig. 12 represents a plan of a modified form of controlling device in which the piston heads are located in cylinders parallel to each other rather than in alinement as shown in Fig. 4. Fig. 13 represents a vertical section of the same, the cutting plane being on line 13—13 on Fig. 12. Fig. 14 represents a horizontal section of the same, the cutting plane being on line 14—14 on Fig. 13. Fig. 15 represents a vertical transverse section of the same, the cutting plane being on line 15—15 on Figs. 13 and 14. Fig. 16 represents a horizontal section of the same, the cutting plane being on line 16—16 on Fig. 13. Fig. 17 represents a horizontal section through the cylinder head, the cutting plane being on line 17—17 on Figs. 13, 15 and 18, and Fig. 18 represents a transverse section of the same, the cutting plane being on line 18—18 on Fig. 17.

Similar characters designate like parts throughout the several figures of the drawings.

In the drawings, 26 represents the casing of a controlling device, said casing being preferably cylindrical in cross section and having secured to the flanges at either end thereof by means of bolts or other securing members, the heads of closures 27. Intermediate of its ends, the casing 26 is provided with the projecting members 28 by which it may be secured in any desired position. Midway of its ends, the cylindrical casing 26 is provided with bearings 29 formed therein or secured thereto, in which is mounted a revoluble shaft 30 to the upper end of which is secured a hand wheel 31,— while within the chamber of said casing 26 the shaft has secured thereto a pinion 32. The teeth of this pinion mesh with the teeth of a rack 33 formed upon or secured to a separating member 34 to either end of which is secured a piston head 35, fitting the interior bore of the cylinder 26 and preferably of greater diameter than the separating member 34. The separation of the piston heads 35 by means of the member 34, forms a space or compartment between said heads adapted to be filled with fluid. The supply of fluid to this piston chamber or compartment is admitted through the pipe 36 communicating therewith, and having secured to its opposite end a reservoir 37 adapted to contain a supplemental supply of fluid. The reservoir 37 is preferably cylindrical and has mounted therein a plunger 38, secured to a tubular stem 39 extending upwardly through the closure 40 for said reservoir. This stem 39 is provided with a plurality of annular teeth 41 with which mesh the teeth of a revoluble member 42 mounted in a bearing in the closure 40 and provided with a hand wheel 43 by which it may be turned to raise the plunger 38 in the reservoir 37 against the tension of a spring 44, normally tending to force the plunger 38 downwardly against any fluid beneath it. The upper end of the stem 39 is provided with a valve 45 normally closed. This valve provides a means whereby, when open, the air beneath the plunger or piston 38 may be wholly removed from the reservoir 37 whenever the removal of this air becomes necessary.

It is obvious that the spring 44 acting upon the plunger 38 will force any fluid beneath it through the pipe 36 into the space between the piston heads 35. The plunger 38 has a passage therethrough which is normally closed by a spring-pressed check valve 47 which prevents any fluid beneath the plunger from passing upwardly through said plunger into the chamber above,—while the fluid beneath said plunger may be replenished at any time by moving the plunger upwardly against the tension of the spring 44, this upward movement of the plunger being effected by means of the revoluble toothed member 42 engaging with the teeth 41 of the tubular stem 39. The fluid passing through the pipe 36 into the space between the piston heads is therefore supplied thereto under pressure.

In each end of the separating member 34 is a passage 48 normally closed by a spring-pressed check valve 49,—this check valve being adapted to prevent the fluid contained within the space between the piston heads being affected by the pressure of the fluid in the ends of the cylinders 26 during the reciprocating movement of the piston therein. Should, however, any leakage occur in the system thereby reducing the pressure in either of the cylinders 26, the excessive pressure of the fluid contained within the space between the piston heads will automatically open a check valve 49 and permit sufficient fluid to pass through the passage 48 to replenish any deficiency due to this leakage. This leakage may be from the system as a whole, causing a vacuum in one or both sides of the system unless some provision is made to replenish any deficiency caused thereby, or there will be a quantity of air sucked into the system equal to the amount of liquid leaked out. When such a leakage occurs and the deficiency caused thereby is not replenished, the movement of the actuating piston by means of the controlling piston is inaccurate and does not positively operate as soon as the controlling piston commences to move, as it is quite essential should be the case.

It is quite obvious that, by means of the reservoir 37 herein provided containing an additional quantity of fluid under pressure and separated from the fluid in the main portion of the system only by the check valves 49, any leakage from the system will be immediately and automatically replenished therefrom. In some cases the leakage may be across from one side of the system to the other, thus causing the two ends of the system to be out of register with each other. When this leakage occurs, the actuating device will become out of register with the controlling device, thereby making the apparatus practically useless. This necessitates providing so far as possible against any leakage past the pistons and providing a means for quickly and positively re-adjusting the register should there be any leakage, without any delay and without interfering with the operation of the device. This is accomplished by means of a valved by-pass pipe to be hereinafter described.

The ends of the cylinders 26 are in communication with the corresponding ends of the cylinder 51 through the tubes or pipes 52,—53, and 54. It is obvious that any one or more of these pipes 52,—53, and 54 may be either flexible or rigid without altering the principles of the present invention. It is self evident from an inspection of the drawings that by connecting the ends of the cylinders 26 and 51 by means of this system of piping, 52, 53 and 54, the fluid is wholly confined within the system and requires no renewal except that which is needed to replenish the deficiency due to leakage.

The piston heads 50 are connected together by means of a rod or bar 55 provided with a plurality of rack teeth 56 with which mesh the teeth of a pinion 57 formed upon or secured to an actuating shaft 58 mounted in suitable bearings 59 formed in or secured to an enlargement 60 of said cylindrical casing 51, intermediate its ends. This enlargement 60 may be formed integrally with the cylindrical portions 51 of said casings, or be a separate member as shown in the drawings with the cylindrical member 51 passing therethough. In either case the enlargement 60 is provided with suitable flanged members 61 by which the actuating device may be secured in any desired position. It is obvious that as the piston reciprocates in the bore of the cylinder 51, the teeth 56 formed upon or secured to the connecting member 55 will cause a rotation of the actuating shaft 58 which may be utilized for any desired purpose.

The pipes 54 leading to the actuating device connect directly to the cylinder heads 62, secured to the ends of the cylindrical casing 51 by bolts or other suitable securing devices, and communicate with the passage 54$^x$ therein. Preferably the separating rod 34 is provided with a flat side against which the ends of the member 63 threaded into the casing 26 is adapted to bear to prevent the turning of said member 34. In a similar manner the end of the member 64 threaded into a hub of the enlargement 60 bears against the flat side of the connecting member 55 and prevents it from turning about its axis.

Each cylinder head 62 is provided with an air outlet 65 normally closed by means of a valve 66. When the system is being filled with fluid preparatory to its use, the valve 66 is opened to permit the escape of any air from the cylinder 51 and is again closed as soon as the cylinder is completely filled with fluid.

The cylinder heads 27 of the controlling device are each provided with a similar air outlet 67 closed by a valve 68 for the same purpose. The passages 52$^x$ are connected by means of a by-pass pipe 69 connecting with each passage 52$^x$ at 69$^x$. In this by-pass pipe 69 is located a valve 70 normally closed but which may be opened to permit the pistons to be adjusted into register,—which having been accomplished, the valve is again closed, and remains closed during the operation of the device.

The by-pass pipe 69 is divided with its adjacent ends threaded as shown at 71 in Fig. 5, and each end is provided with a packing member 72 or 73 set into an annular groove formed in the periphery of said pipe. On one side of the packing member 72, the by-pass pipe 69 has secured thereto, or formed thereon, a shouldered member 74,—and between the two packing members 72 and 73 is threaded a coupling member 75 which bridges the ends of the pipe members 69 and bears upon the packing members 72 and 73 as shown in said Fig. 5. On the opposite side of the packing member 73 is threaded a clamping member 76 which is adapted to be moved along the threads of said by-pass pipe 69 until its end bears firmly in contact with the face of the packing member 73,—thus making a very tight joint and preventing any leakage from said by-pass pipe 69 when the various coupling members are properly positioned.

The casing 26 is provided with an air pasage 77 communicating with the space between the piston heads 35 from which space the air is permitted to pass when the valve 78 threaded to said casing 26 is opened.

The filling of the system is most readily accomplished by removing the closure cap 40 and the piston or plunger 38 of the reservoir 37. Then with all the air valves 77, 68 and 66 open the liquid is poured into the reservoir 37. The check valves 49 usually offer sufficient resistance to the flow of the liquid to cause the space between the pistons 35 in the cylinder 26 to become full before the remainder of the system. This is indicated by the fluid or liquid appearing through the first air valve 77. This valve must then be closed. The filling of the remainder of the system is facilitated by inserting the plunger or piston 38 after each filling of the reservoir 37 and forcing the liquid through the check valves 49, repeating this operation as many times as may be necessary to completely fill the system. The air valves 68 and 66 should be watched during the process and each one closed as soon as the fluid appears. When the system is entirely filled, the plunger or piston 38 is inserted and the closure cap 40 secured in place. Thereafter additional supplies of oil may be poured in through the opening plugged by 46. The operator by means of the handle 43 may then raise the plunger 38 into any desired position to secure the proper tension upon the spring 44, and in so doing, the valve 47 in said plunger will operate to permit the passage of the fluid above the plunger to the space below the same. All of the fluid then beneath the plunger 38, in the pipe 36 and in the space between the piston heads 35, will be subjected to the pressure of said spring. As the chambers of the cylinders 26 and 51 and the pipes 52, 53 and 54 are completely filled with fluid, it is obvious that any movement of the controlling piston 35 in either direction will act through the medium of said fluid to immediately cause similar movement of the actuating piston 50, and the rotation of the actuating shaft 58. It is self evident that as the piston 35 is moved in one direction, it pushes the fluid in advance thereof through one set of pipes 52, 53 or 54 against the end of the actuating piston 50,—and the suction created at the opposite end of said piston 35 causes the fluid from the opposite end of the piston 50 to pass through the other set of pipes 54, 53 or 52 into the opposite end of the cylinder 26.

When the pistons 35 and 50 are centered in their cylinders 26 and 51, the whole system is equally balanced and there is an equal amount of fluid on either side of said pistons. As soon as there is any leakage from any of the cylinders from any cause, the reduced pressure in the cylinders and pipes will permit the greater pressure of the fluid in the space between the piston heads 35 to actuate the check valves 49 to permit sufficient fluid under pressure to pass through the openings 48 into the ends of the cylinder 26 to replenish any deficiency there may be in either side of the system, due to the leakage of fluid therefrom. By this construction, the apparatus is automatically replenished at any time when any deficiency in the fluid occurs, and the simultaneous operation of the actuating piston 50 and the controller piston 35 is effected whenever the operator rotates the shaft 30 by means of the hand wheel 31. It is quite evident that by this means the slightest movement of this hand wheel will be immediately transmitted through the actuating piston 50 to the actuating shaft 58 and operate any other device to which it may be connected, no matter how remotely situated the device to be operated may be from the controlling device. Whenever the pressure in the reservoir becomes decreased, it may be readily increased by the raising of the plunger 38, permitting a fresh amount of fluid to pass from that portion of the reservoir above the plunger into the space below said plunger,—the lifting of the plunger 38 compressing the spring 44 and increasing the pressure upon the fluid beneath said plunger.

It is also evident that if desired the by-pass could be equally as well located between the connecting pipes 52 or 54 without altering the principles of the invention,—it only being necessary that some provision should be made so that the fluid could pass from one side of the system to the opposite side, while the pistons in the cylinders of the controller and actuating device are brought into register.

In some cases where a system is in operation, difficulty may be found in using the type of controller shown in Figs. 1 to 7 inclusive, owing to the limited space accorded for this purpose. In such an event it is highly desirable that a controller should be provided having greater height than width, and in order to accommodate the controller to such conditions, the type of controller shown in Figs. 12 to 18 inclusive, is provided. In this type of controller the two ends of the cylinder are brought together in parallelism and the connecting member and rack between the piston heads 35 are separated, with the manually operated pinion meshing with both racks so that when said pinion is rotated, one piston head is moved in one direction while the other piston head is moved in the opposite direction. The combined volumes of the two chambers in the cylinders between the piston heads and the cylinder heads is constant as in the other type of controller, in which the two ends of the cylinders are in alinement. The reservoir 37 used in this type of controller is exactly the same as that used in the horizontal type, and communicates through the pipe 36 with the chamber 80 formed in the base 81. This chamber 80 is the equivalent for the space between the piston heads 35 in the horizontal type of controller shown in Figs. 1 to 7 of the drawings.

Secured to the upper end of the base 81 by bolts or other suitable fastening means, is a casing 82 provided with two cylindrical chambers 83 parallel to each other and in each of the cylinders 83 is mounted a reciprocating piston 84 provided with a stem or rod 85. The piston rods 85 have secured thereto or formed thereon, rack members 86, the teeth of which face one another and are separated sufficiently to admit between them a pinion 87 secured to or formed upon a shaft 88 revoluble in bearings 89, secured to or formed in said base 81. The ends of the shaft 88 extend through said bearings 89 and to each outer end is secured a wheel 90, each wheel being provided with a stud 91 oppositely disposed relative to the other, upon which is mounted a suitable revoluble handle 92 adapted to be gripped by the hand of the operator. It is obvious that when the operator grips the handles 92, one in each hand, and revolves the shaft 88, the pinion 87 thereon will cause one of the pistons 84 to be moved in one direction and the other piston to be moved an equal distance in the opposite direction.

The cylinders 83 are provided at their upper ends with a cylinder head 93 provided with passages 94 from said cylinders to pipes 95 communicating with the opposite ends of the actuating cylinder 51. It is obvious therefore, as the pistons 84 move in opposite directions, the fluid will be forced through one of the pipes 95 into one end of the actuating cylinder 51,—while a suction will be created in the other cylinder into which will pass the fluid from the pipe 95 communicating with the opposite end of said actuating cylinder 51 in a similar manner as has heretofore been described.

When any leakage occurs in the system, the fluid under pressure in the chamber 80, constantly replenished by the additional supply in the reservoir 37, will pass through the opening 96 opening the valve 97 therein and replenish any deficiency that may be due to leakage from the system,—thus keeping the two sides of the system properly balanced at all times and the system completely filled with fluid so that any movement of the shaft 88 will immediately transmit a similar rotary movement to the actuating shaft 58.

Each rod 85 and rack 86 is mounted in a suitable guide 98 formed upon or secured to the inner wall of the chamber 80,—said guides being so constructed as to prevent the turning of these rods about their axes. The cylinder head 93 is provided with a by-pass 99 between the passages 94,—this by-pass being provided with a valve 100 manipulated by a handle 101.

When it is desired to register the pistons 84 with the piston 50 in the actuating cylinder, the valve 100 is opened, and when the various pistons have been brought into register with one another, the valve 100 is closed and remains closed throughout the operation of the apparatus. An air outlet 102 communicates with either end of said by-pass 99, and is normally closed by the valves 103 which may be opened during the process of filling the system with fluid to permit the escape of any air that there may be in the cylinders,—the valves 103 being again closed as soon as the cylinders have been filled. This type of controller operates in substantially the same manner as the horizontal type of controller.

An apparatus constructed as hereinbefore described, with the fluid which operates the actuating shaft equally distributed in either side of the system and communicating with a reservoir containing fluid under pressure adapted to automatically replenish any deficiency in the fluid in the system due to any leakage therefrom, permits the actuating shaft to be under the immediate control of the operator manipulating the hand wheel so that the slightest movement of said wheel will immediately cause a similar movement of the actuating shaft. This is of great importance in the manipulation of the steering mechanism of a vessel and in the manipulation of the turret of a battle ship,—it being quite obvious that it is absolutely necessary that the operator should know just what result each movement of the controller has effected on the actuating shaft which he is endeavoring to control from a distance. This, as far as is known, has heretofore been impossible as the leakages occurring in various systems which have been in use have always caused an imperfect operation of the actuating device,—considerable movement of the controller being necessary before the actuating device begins to operate, and as the leakage increases, and the variation in the movements of these two members becomes greater,—the operator has no means of knowing just what this variation may be at any given time. All of these objections are wholly obviated by the apparatus herein described, as the actuating member is always under the immediate control of the operator, and the controlling device and actuating device operate synchronously under all conditions.

It is believed that the operation and many advantages of the invention will be readily understood without further explanation.

Having thus described my invention, I claim:

1. In an apparatus of the class described, the combination of a chamber adapted to contain fluid; a piston therein provided with a compartment intermediate its ends adapted to contain fluid; a revoluble shaft adapted in its rotation to move said piston; means permitting the liquid in said chamber to circulate during the movement of said piston; and a valved passage through each end of said piston communicating with said intermediate compartment.

2. In an apparatus of the class described, the combination of a chamber adapted to contain fluid; a piston therein consisting of two heads connected by a rack member, and provided with a valved passage through each piston head; a revoluble shaft; a pinion secured thereto meshing with said rack; means for supplying fluid to the space intermediate said heads; and means permitting the fluid in said chamber to circulate during the movement of said piston.

3. In an apparatus of the class described, the combination of a chamber adapted to contain fluid; a piston therein consisting of two heads connected by a rack member, and provided with a valved passage through each piston head; a revoluble shaft; a pinion secured thereto meshing with said rack; means permitting the fluid in said chamber to circulate during the movement of said piston; and means for supplying fluid under pressure to the space intermediate said heads.

4. In an apparatus of the class described, the combination of a chamber adapted to contain fluid; a piston therein provided with two heads rigidly connected together, and provided with a valved passage through each piston head; means for providing a fluid supply under pressure to the space between said heads; a revoluble shaft adapted to operate said piston; and means permitting the fluid in said chamber to circulate during the movement of said piston.

5. In an apparatus of the class described, consisting of two chambers each divided into two compartments by a movable member, the compartments on each side of said movable members being connected together at their ends by pipes, thus forming a system adapted to confine therein fluid completely filling the same; of means for controlling the movement of one movable member and thereby effecting a movement of the other movable member; an actuating shaft operable by the movement of the second movable member; a reservoir containing fluid and connected to one of the cylinders of said system at a points intermediate the ends of its piston; check valves in the ends of said piston; and a spring-pressed plunger contained therein for forcing into said system sufficient fluid to replace any leakage therefrom.

6. In an apparatus of the class described, consisting of two chambers each divided into two compartments by a movable member, the compartments on each side of said movable members being connected together at their ends by pipes, thus forming a system adapted to confine therein fluid completely filling the same; of means for controlling the movement of one movable member and thereby effecting a movement of the other movable member; an actuating shaft operable by the movement of the second movable member; a reservoir containing fluid and connected to one of the cylinders of said system at a point intermediate the ends of its piston; check valves in the ends of said piston; a spring-pressed plunger within said reservoir; and means for raising said plunger against the tension of said spring.

7. In an apparatus of the class described, consisting of two chambers each divided into two compartments by a movable member, the compartments on each side of said movable members being connected together at their ends by pipes, thus forming a system adapted to confine therein fluid completely filling the same; of means for controlling the movement of one movable member and thereby effecting a movement of the other movable member; an actuating shaft operable by the movement of the second movable member; a reservoir containing fluid and connected to one of the cylinders of said system at a point intermediate the ends of its piston; check valves in the ends of said piston; a spring-pressed plunger within said reservoir; a stem on said plunger, and means co-acting therewith extending through the reservoir casing whereby said plunger may be raised against the tension of said spring.

8. In an apparatus of the class described, consisting of two chambers each divided into two compartments by a movable member, the compartments on each side of said movable members being connected together at their ends by pipes, thus forming a system adapted to confine therein fluid completely filling the same; of means for controlling the movement of one movable member and thereby effecting a movement of the other movable member; an actuating shaft operable by the movement of the second movable member; a reservoir containing fluid and connected to one of the cylinders of said system at a point intermediate the ends of its piston; check valves in the ends of said piston; a spring-pressed plunger therein; a stem on said plunger; means co-acting therewith extending through the reservoir casing whereby said plunger may be raised against the tension of said spring; and a check valve in said plunger preventing the return of the fluid therethrough.

9. In an apparatus of the class described, a cylinder adapted to be filled with fluid; a reciprocating piston therein consisting of two heads each fitting the bore of the cylinder and secured to the end of a separating rod; a check valve in each end of said rod permitting fluid to pass from the space between said heads into either end of the cylinder; and means for filling said space between said heads with fluid under pressure.

10. In an apparatus of the class described, a cylinder adapted to be filled with fluid; a reciprocating piston therein consisting of two heads each fitting the bore of the cylinder and secured to the end of a separating rod; a check valve in each end of said rod permitting fluid to pass from the space between said heads into either end of the cylinder; means for filling said space between said heads with fluid under pressure; and a valved by-pass connecting the two ends of said cylinder.

11. In an apparatus of the class described, a cylinder adapted to be filled with fluid; a piston contained therein provided with a fluid filled compartment intermediate its ends; a device for positively reciprocating said piston in said cylinder; and means permitting the passage of portions of the fluid in said piston compartment into either end of said cylinder.

12. In an apparatus of the class described, a cylinder adapted to be filled with fluid; a piston contained therein provided with a fluid filled compartment intermediate its ends communicating by passages with each end of said cylinder; a device for positively reciprocating said piston in said cylinder; and check valves in said passages operable to admit to the ends of said cylinder, fluid from said piston compartment.

13. In an apparatus of the class described, a cylinder adapted to be filled with fluid; a piston contained therein provided with a fluid filled compartment intermediate its ends communicating by passages with each end of said cylinder; and check valves in said passages automatically operable to admit to the ends of said cylinder, fluid from said piston compartment when the pressure in the cylinder is reduced by leakage therefrom.

14. In an apparatus of the class described, a cylinder adapted to be filled with fluid; a piston contained therein provided with a fluid filled compartment intermediate its ends communicating by passages with each end of said cylinder; check valves in said passages; and a valved passage in each end of said cylinder for the exit of air.

15. In an apparatus of the class described, a cylinder adapted to be filled with fluid; a piston contained therein provided with a fluid filled compartment intermediate its ends communicating by passages with each end of said cylinder; check valves in said passages; a valved passage in each end of said cylinder for the exit of air; and a similar valved passage communicating with said fluid filled compartment in the piston.

16. In an apparatus of the class described, a controller; a fluid reservoir connected to said controller by a plurality of passages; a plunger therein; a tubular stem extending through said plunger and the reservoir casing and provided with a plurality of teeth; a toothed member revoluble in the reservoir casing and engaging said stem; a valve on said stem; and valves in said passages permitting the fluid from the reservoir to automatically flow into the system and replenish any leakage therefrom.

17. In an apparatus of the class described, the combination of two fluid cylinders; pipes connecting the ends of said cylinders; a manually operated piston in the controller cylinder having a valved passage at each end communicating with the chamber in the end of the cylinder; a driving piston in the other operable by the movement of the controller piston, through the medium of the fluid contained within the cylinders and pipes; and a reservoir containing fluid under pressure connected to the controller cylinder intermediate its ends adapted to replenish through said valved passages in the controller piston any leakage from said cylinders and pipes.

18. In an apparatus of the class described, the combination of two fluid cylinders; pipes connecting the ends of said cylinders; a manually operated piston in the controller cylinder having valved passages therein; a driving piston in the other operable by the movement of the controller piston, through the medium of the fluid contained within the cylinders and pipes; a reservoir containing fluid under pressure connected to the controller cylinder; and a valved plunger in said reservoir adapted to force through said controller cylinder and said valved passages a portion of the fluid from said reservoir to, and replenish any leakage from, the system of cylinders and pipes.

19. In an apparatus of the class described, the combination of two fluid cylinders; pipes connecting the ends of said cylinders; a manually operated piston in controller cylinder having valved passages; a driving piston in the other operable by the movement of the controller piston, through the medium of the fluid contained within the cylinders and pipes; a reservoir containing fluid under pressure connected to the controller cylinder, and a spring-pressed plunger in said reservoir adapted to force a portion of the fluid from said reservoir through the valved passages in the controller piston and replenish any leakage from said cylinders and pipes.

20. In an apparatus of the class described, the combination of two fluid cylinders; pipes connecting the ends of said cylinders; a manually operated piston in the controller cylinder having valved passages; a driving piston in the other operable by the movement of the controller piston, through the medium of the fluid contained within the cylinders and pipes; a reservoir containing fluid under pressure connected to the controller cylinder; a spring-pressed plunger in said reservoir adapted to force through said controller cylinder and the valved passages in its piston a portion of the fluid from said reservoir and replenish any leakage from the system of cylinders and pipes; and means for withdrawing the air from said reservoir.

21. In an apparatus of the class described, a cylinder adapted to contain fluid; a piston therein consisting of two separated heads connected together with a space between said heads adapted to be filled with fluid; a supply reservoir connected therewith; means within said reservoir for forcing fluid therefrom into said piston space and preventing its return; and valved passages in the piston heads permitting the flow of the fluid from said piston space to either end of said cylinder and preventing its return thereto.

22. In an apparatus of the class described, a cylinder adapted to contain fluid; a piston therein consisting of two separated heads connected together with a space between said heads adapted to be filled with fluid; a supply reservoir connected therewith; means permitting the passage of a portion of the fluid therefrom into said piston space and preventing its return; and valved passages in the piston heads permitting the flow of the fluid from said piston space to either end of said cylinder and preventing its return thereto.

23. In an apparatus of the class described, a cylinder adapted to contain fluid; a piston therein having a fluid filled space therein intermediate its ends; means preventing the fluid in said piston space from being subjected to the operative pressure in said cylinder, but permitting it to pass from said space into either end of said cylinder to replenish any leakage therefrom; and means for replenishing the fluid in said space.

24. In an apparatus of the class described, a cylinder adapted to contain fluid; a piston therein having a fluid filled space therein intermediate its ends; means preventing the fluid in said piston space from being subjected to the operative pressure in said cylinder, but permitting it to pass from said space into either end of said cylinder to replenish any leakage therefrom; and means for automatically filling said piston space with fluid under pressure.

25. In an apparatus of the class described including a controller cylinder connected to the apparatus by a system of pipes; a piston in said cylinder provided with a fluid-filled compartment intermediate its ends; a replenishing reservoir connected to said cylinder and communicating with said fluid-filled compartment in said piston; a plunger therein; a check valve in said plunger normally closed when moving in the direction of said apparatus; and means behind said plunger tending to force the fluid in front thereof into said apparatus.

26. In an apparatus of the class described including a controller cylinder connected to the apparatus by a system of pipes; a piston in said cylinder provided with a fluid-filled compartment intermediate its ends; a replenishing reservoir connected to said cylinder and communicating with said fluid-filled compartment in said piston; a plunger therein; a check valve in said plunger normally closed when moving in the direction of said apparatus; means behind said plunger tending to force the fluid in front thereof into said apparatus; and an air valve controllable from the exterior of said reservoir adapted to withdraw or admit air from the space in front of said plunger.

27. In an apparatus of the class described, a fluid cylinder; a piston therein having separated heads forming a fluid filled space; a supply reservoir communicating with said space and adapted to fill said space with fluid under pressure; a check valve in each piston head adapted to permit the flow of the fluid in said space into either end of said cylinder and prevent its return thereto; and an actuating member positioned within the space between said heads and adapted to move said piston in either direction.

28. In an apparatus of the class described, the combination of a casing having three fluid filled compartments therein; two piston heads therein separating each end compartment from the intermediate compartment; means for automatically filling the intermediate compartment with fluid under pressure; check valves in said piston heads permitting the passage of the fluid from said intermediate compartment to each end compartment; and means for moving simultaneously said piston heads.

29. In an apparatus of the class described, the combination of a casing having three fluid filled compartments therein; two piston heads therein, separating each end compartment from the intermediate compartment; means for automatically filling the intermediate compartment with fluid under pressure; check valves in said piston heads permitting the passage of the fluid from said intermediate compartment to each end compartment; and a revoluble member for moving simultaneously said piston heads.

30. In an apparatus of the class described, the combination of a chamber adapted to contain a fluid; a movable fluid-tight member in said chamber dividing said chamber into two compartments and having a fluid space intermediate its ends; means for admitting fluid to each compartment from a fluid supply under pressure through said fluid space, but preventing its return from said compartments; and tubular connections between said compartments and corresponding compartments of another chamber containing a movable member.

31. In an apparatus of the class described, the combination of two chambers; a manually operated fluid-tight movable member dividing one of said chambers into two compartments and provided with a fluid-space intermediate its ends; a fluid-tight movable member in the other chamber; means for transmitting externally the movement of the last mentioned movable member; pipes connecting the two compartments of one chamber with the compartments of the other chamber, thus forming two distinct systems separated by said movable members, and adapted to contain fluid; and a reservoir adapted to contain fluid under pressure, and communicating through said fluid space by passages with both systems, said passages being provided with check valves to prevent the flow of the fluid back into said reservoir.

32. In an apparatus of the class described, the combination of two chambers; a manually operated fluid-tight movable member dividing one of said chambers into two compartments and provided with a fluid-space intermediate its ends; a fluid-tight movable member in the other chamber; means for transmitting externally the movement of the last mentioned movable member; pipes connecting the two compartments of one chamber with the compartments of the other chamber, thus forming two distinct systems separated by said movable members, and adapted to contain fluid; and a reservoir adapted to contain fluid under pressure and communicating through said fluid space by passages with both systems; said passages being provided with check valves to prevent the flow of the fluid back into said reservoir; and a by-pass between the two systems containing an operable valve.

33. In an apparatus of the class described, the combination of a chamber adapted to contain a fluid; a movable fluid-tight member in said chamber dividing said chamber into two compartments and provided with a fluid space intermediate its ends; means for admitting fluid to each compartment from a fluid supply under pressure through said fluid space, but preventing its return from said compartments; a valved by-pass between said compartments; and tubular connections between said compartments and corresponding compartments of another chamber containing a movable member.

Signed by me at 4 P. O. Sq., Boston, Mass. this 1st day of January 1910.

REYNOLD JANNEY.

Witnesses:
WALTER E. LOMBARD,
DONALD G. McLEAN.